July 14, 1931.  G. W. VEALE  1,814,421

CONNECTING MEANS FOR BUMPERETTES

Filed May 1, 1930

Inventor
George W. Veale
Kwis Hudson & Kent
attys.

Patented July 14, 1931

1,814,421

UNITED STATES PATENT OFFICE

GEORGE W. VEALE, OF CLEVELAND HEIGHTS, OHIO, ASSIGNOR TO THE EATON AXLE & SPRING COMPANY, OF CLEVELAND, OHIO, A CORPORATION OF OHIO

CONNECTING MEANS FOR BUMPERETTES

Application filed May 1, 1930. Serial No. 449,062.

This invention relates to devices for connecting pairs of bumperettes, and as its principal object aims to provide an improved form of construction for such devices.

Further objects and advantages of the invention will be apparent from the following description and from the accompanying sheet of drawings which, for the purpose of illustration, shows one embodiment of the invention defined by the claims.

Figure 1 of the drawings is a rear elevational view of a vehicle equipped with bumperettes to which a connecting device embodying my invention has been applied;

Figure 1:
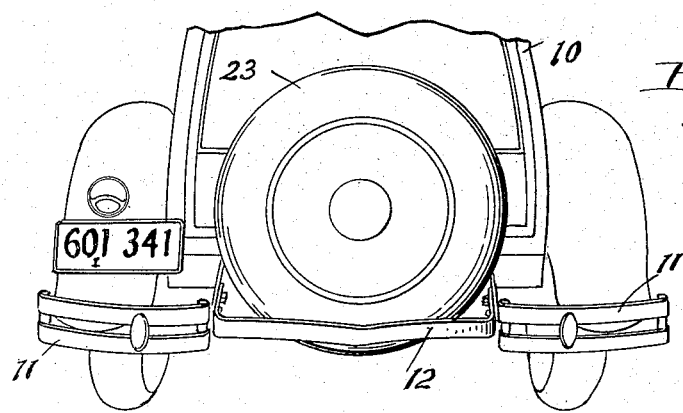
Figure 2:
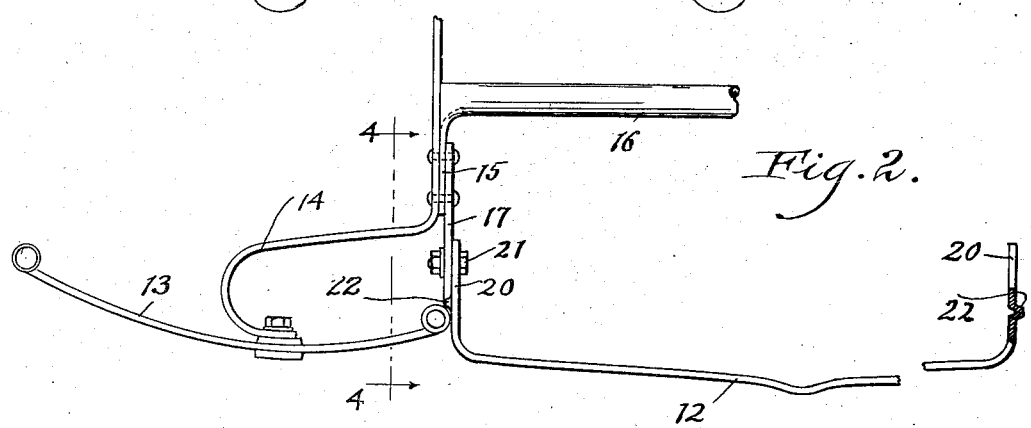
Fig. 2 is a top plan view showing one of a pair of bumperettes and the manner of applying one end of my connecting device thereto.
Figure 3:
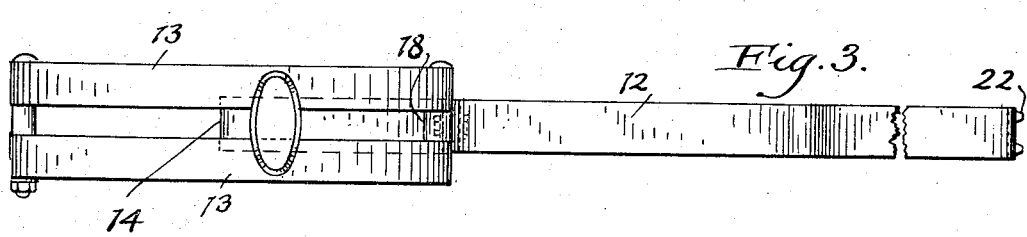
Fig. 3 is an elevational view of the arrangement shown in Fig. 2.

In the drawings illustrating my invention, I have shown a bumperette connecting device which may be applied to a vehicle as a part of its original equipment, or which may be quickly and easily applied to the bumperettes as an accessory.

Figure 4:
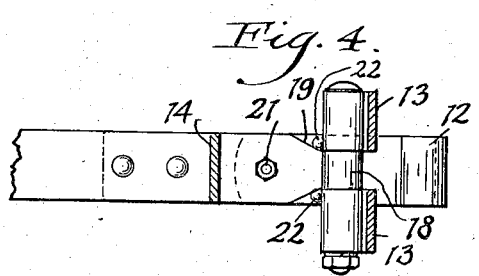
Fig. 4 is a sectional elevation taken on line 4—4 of Fig. 2.
Figure 5:
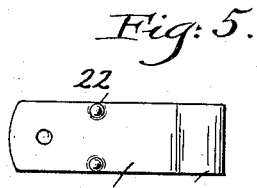
Fig. 5 is a detached end elevational view of the connecting device.
Figure 6:
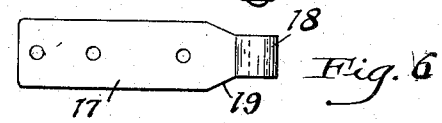
Fig. 6 is a detached elevational view of the auxiliary supporting arm of one of the bumperettes.

In Fig. 1 of the drawings, I have shown a vehicle 10 equipped with a pair of bumperettes 11 to which the connecting device 12 of my invention has been applied. The bumperettes may be of any suitable form of construction, but, as here illustrated, comprise vertically spaced impact bars 13 which are supported at a point intermediate their ends by being clamped to one end of the flexible main supporting arm 14. The other end of this supporting arm extends forwardly and is riveted or otherwise clamped to a suitable supporting portion of the vehicle structure, and is also connected to the flange 15 which extends rearwardly from the transverse member 16. At their inner ends, that is at their ends which are nearest the center-line of the vehicle, the impact bars are pivoted to one end of the auxiliary supporting arm 17. The opposite end of this auxiliary arm is clamped against the flange 15 by the same means which connects this flange to the main supporting arm 14. At the point of connection between the auxiliary arm 17 and the impact bars, this arm is provided with an eye 18, adjacent which edge portions of the arm are tapered or oppositely inclined, as indicated at 19 in Figs. 4 and 6.

When installed in place the connecting device of my invention extends transversely between the bumperettes, as shown in Fig. 1, and is connected to the latter at a point rearwardly of the connection of the flange 15 with the main and auxiliary supporting arms so as to reenforce the bumperettes against lateral deflection.

The connecting device preferably comprises a bar of spring steel having end portions thereof bent to form forwardly extending, substantially parallel, supporting arms 20. Adjacent the ends of these arms openings are provided which are adapted to be aligned with openings provided in the auxiliary supporting arms of the bumperettes to receive clamping means, such as the bolts 21. Adjacent each opening provided in the supporting arms of the connecting device I provide a pair of spaced lugs 22 arranged to engage the oppositely inclined edge portions of the auxiliary supporting arm. These lugs may be of any suitable form, but, as here shown, are integral with the arms of the connecting device and comprise slugs of metal displaced laterally by a shearing operation. The engagement of these lugs with the oppositely inclined edge portions of the auxiliary arms prevents the connecting device from pivoting upon the clamping means which connects the latter to the bumperettes. In addition to their function of preventing the connecting device from being swung upwardly or downwardly out of its proper position, these lugs also assist in bringing the openings of the connecting device into alignment with the openings of the auxiliary arms of the bumperettes, thus facilitating the installation of the connecting device.

The supporting arms of the connecting device are preferably made of such a length as to bring the transversely extending portion of this device into a position spaced rearwardly slightly from the spare wheel 23 supported upon the rear end of the vehicle. In this position the connecting device affords some protection for the spare wheel.

The connecting device may be suitably finished so as to harmonize with other portions of the vehicle and thereby add to the completeness and attractiveness of the vehicle.

It will now be readily seen that I have provided a form of connecting device which can be easily and quickly secured in place, and which materially reenforces and strengthens the bumperettes. In addition to the reenforcing of the bumperettes and the protecting of the spare wheel, this device also enhances the appearance of the vehicle.

While I have illustrated and described the device of my invention in a detailed manner, it should be understood, however, that I do not intend to limit myself to the precise details and arrangements shown and described, but regard my invention as including such changes and modifications as do not involve a departure from the spirit of the invention and the scope of the appended claims.

Having thus described my invention, I claim:

1. In combination, a vehicle, bumperette supporting means secured to said vehicle, a pair of bumperettes, means connecting said bumperettes with said supporting means including a substantially forwardly extending member having a tapered portion, and a connecting member having end portions thereof clamped to said forwardly extending member and provided with lugs arranged to engage said tapered portion.

2. In combination, a vehicle, bumperette supporting means secured to said vehicle, a pair of bumperettes each having a substantially forwardly extending arm clamped to said supporting means, and means connecting said bumperettes comprising a bar having end portions clamped to said arms and provided with means adapted to engage edge portions of said arms.

3. In combination with a vehicle having bumperette supporting means, a pair of bumperettes each having a forwardly extending arm clamped to said supporting means, said arms being formed with oppositely inclined edge portions, a connecting member extending between said bumperettes, and means for supportingly securing end portions of said member to said arms including spaced lugs adapted to engage said inclined edge portions.

4. A bumperette connecting device comprising a bar having end portions adapted to be clamped to supporting arms of the bumperettes, and means integral with said end portions adapted to engage edge portions of said supporting arms.

5. A bumperette connecting device comprising a bar having forwardly extending end portions provided with openings adapted to be aligned with openings in the bumperette supporting arms for receiving clamping means therethrough, and means on said bar arranged to engage edge portions of said arms to prevent said bar from pivoting on said clamping means.

6. A bumperette connecting device comprising a bar having forwardly extending end portions provided with openings adapted to be aligned with openings in the bumperette supporting arms for receiving clamping means therethrough, and spaced lugs on said bar arranged to engage oppositely inclined edge portions of said arms to prevent said bar from pivoting on said clamping means.

In testimony whereof, I hereunto affix my signature.

GEORGE W. VEALE.